(12) United States Patent
Kim et al.

(10) Patent No.: US 12,328,158 B2
(45) Date of Patent: Jun. 10, 2025

(54) DYNAMICALLY RECONFIGURABLE TUNING FOR WIRELESS POWER AND DATA COMMUNICATIONS

(71) Applicant: Microsoft Technology Licensing, LLC, Redmond, WA (US)

(72) Inventors: Donghwi Kim, Kirkland, WA (US); David Allen Webber, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 404 days.

(21) Appl. No.: 17/746,085

(22) Filed: May 17, 2022

(65) Prior Publication Data

US 2023/0379002 A1 Nov. 23, 2023

(51) Int. Cl.
*H04B 5/79* (2024.01)
*H02J 50/10* (2016.01)
(Continued)

(52) U.S. Cl.
CPC .............. *H04B 5/79* (2024.01); *H02J 50/10* (2016.02); *H02J 50/80* (2016.02); *H04B 5/72* (2024.01)

(58) Field of Classification Search
CPC .. H02J 50/12; H02J 50/80; H02J 50/90; H02J 50/70; H02J 50/60; H02J 50/50;
(Continued)

(56) References Cited

U.S. PATENT DOCUMENTS 8,400,105 B2   3/2013  Kondo
9,666,359 B2   5/2017  Ichikawa et al.
(Continued)

FOREIGN PATENT DOCUMENTS

EP    1524010 A1      4/2005
KR    101192665 B1   10/2012
KR    20190046250 A   5/2019

OTHER PUBLICATIONS

Cairo, et al., "Reconfigurable System for Wireless Power Transfer (WPT) and Near Field Communications (NFC)", In Proceedings of IEEE of Radio Frequency Identification, vol. 1, Issue 4, Dec. 1, 2017, pp. 253-259.

(Continued)

*Primary Examiner* — Ajibola A Akinyemi
(74) *Attorney, Agent, or Firm* — Weaver IP L.L.C.

(57) ABSTRACT

Methods, systems, and computer program products are provided for dynamically reconfigurable tuning for wireless power and data communications. A wireless charging (WLC) device may improve the efficiency of variable power and data communication to a chargeable device with variable relative positioning and coupling in 3D space by dynamically reconfiguring transmitter tuning. A WLC transmitter may be dynamically reconfigured (e.g., between symmetric and asymmetric antenna impedance matching) based on at least one of the type of wireless transmission or a wireless transmission efficiency for the type of wireless transmission. For example, the controller may dynamically select a configuration for wireless power (e.g., or data) transmission based on the most efficient configuration determined from dynamically measured efficiencies for asymmetric and symmetric wireless power (e.g., or data) transmission. Tuning may be dynamically reconfigured, for example, by controlling an automatically variable inductor (e.g., comprising at least one ring switch) to automatically vary inductance.

20 Claims, 6 Drawing Sheets

(51) Int. Cl.
*H02J 50/80* (2016.01)
*H04B 5/72* (2024.01)

(58) Field of Classification Search
CPC ...... H02J 7/00034; H02J 50/402; H02J 50/20; H02J 50/005; H02J 7/35; H02J 50/10; H02J 7/00304; H02J 7/0047; H02J 50/23
USPC ...................................................... 455/562.1
See application file for complete search history.

(56) References Cited

U.S. PATENT DOCUMENTS

| 2010/0141042 | A1 | 6/2010 | Kesler et al. |
| 2012/0112532 | A1 | 5/2012 | Kesler et al. |
| 2015/0137750 | A1* | 5/2015 | Kirby .......................... G06F 8/65 320/108 |
| 2016/0276877 | A1 | 9/2016 | Weale |
| 2017/0237292 | A1 | 8/2017 | Jeong et al. |
| 2018/0309314 | A1* | 10/2018 | White, II ................ H02J 50/12 |
| 2020/0014109 | A1 | 1/2020 | Leem |

OTHER PUBLICATIONS

"International Search Report and Written Opinion issued in PCT Application No. PCT/US23/013392", Mailed Date: Jun. 19, 2023, 14 Pages.

Baikova, et al., "Electromagnetic Interference Impact of Wireless Power Transfer System on Data Wireless Channel". In Proceedings of the Doctoral Conference on Computing, Electrical and Industrial Systems, Apr. 11, 2016, pp. 293-301.

Feng, et al., "Design of a Non-Contact Slip Ring for Power Transfer and Signal Transmission", In Proceeding of IEEE Wireless Power Transfer Conference, Nov. 15, 2020, pp. 211-214.

* cited by examiner

DYNAMICALLY RECONFIGURABLE TUNING FOR WIRELESS POWER AND DATA COMMUNICATIONS

BACKGROUND

Wireless charging (WLC) devices may transmit power and data to chargeable devices. A WLC transmitter configuration may be better for power transfer and worse for data communication or vice versa.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for dynamically reconfigurable tuning for wireless power and data communications. A wireless charging (WLC) device may include a dynamically reconfigurable transmitter configured to wirelessly transmit power and data (e.g., as first and second type of wireless transmission) to a chargeable device through an (e.g., the same) antenna. A controller may be configured to dynamically reconfigure tuning of the dynamically reconfigurable transmitter (e.g., reconfigure between asymmetric and symmetric antenna impedance matching) based on at least one of the type of wireless transmission or a (e.g., determined) wireless transmission efficiency for the type of wireless transmission. For example, the controller may dynamically select a configuration for wireless power (e.g., or data) transmission based on the most efficient configuration based on dynamically measured efficiencies for asymmetric and symmetric wireless power (e.g., or data) transmission. The controller may dynamically reconfigure tuning, for example, by controlling an automatically variable inductor (e.g., comprising at least one ring switch) to automatically vary inductance. Dynamically reconfigurable tuning may improve the efficiency of variable power and data communication (e.g., reactive (non-radiative) near-field communication) between a WLC and a chargeable device with variable relative positioning and coupling in 3D space.

Further features and advantages of the subject matter (e.g., examples) disclosed herein, as well as the structure and operation of various embodiments, are described in detail below with reference to the accompanying drawings. It is noted that the present subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figures 1A, 1B:
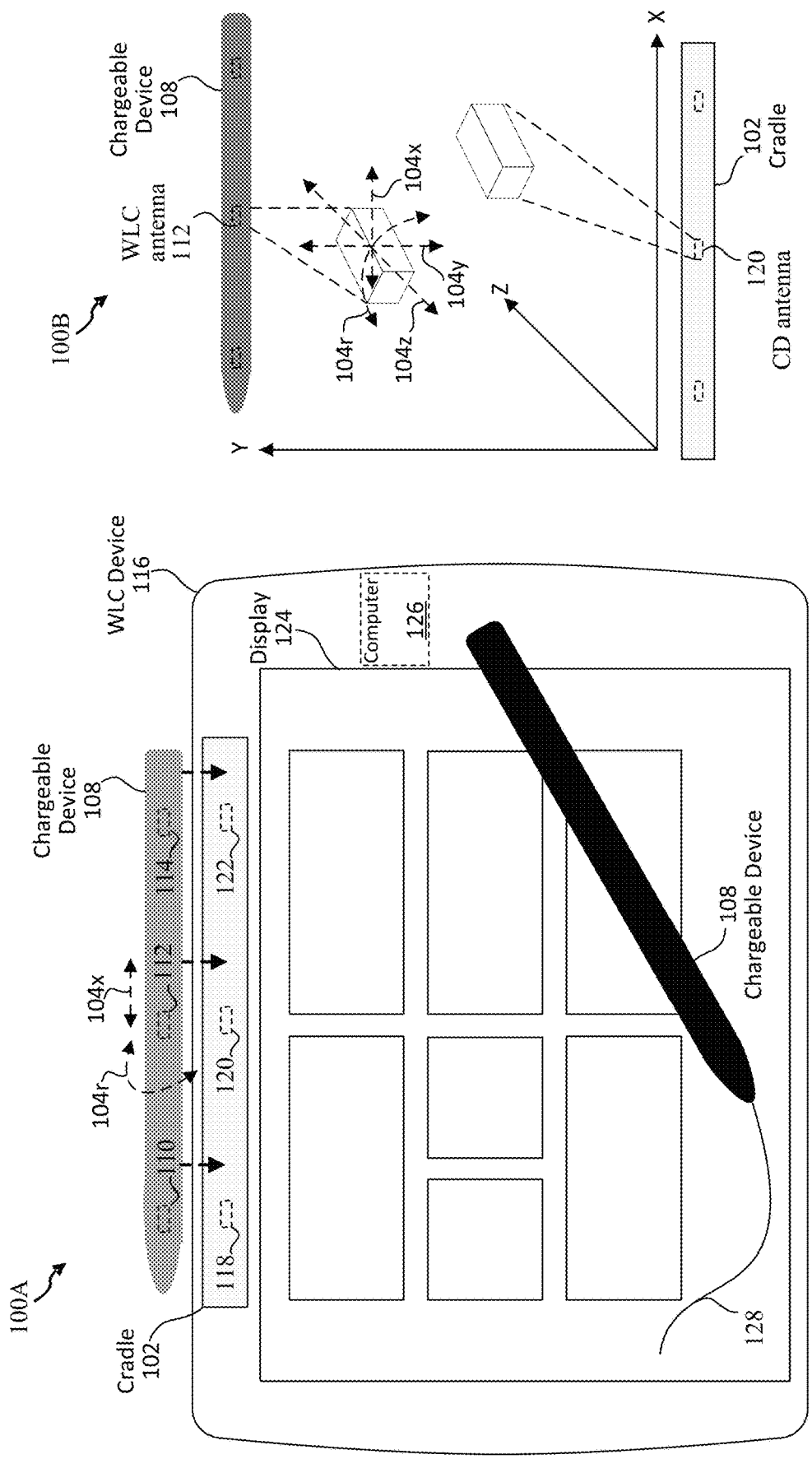
FIGS. 1A and 1B show examples of relative positioning of a wireless charging device and a chargeable device, according to an example embodiment.

The features and advantages of the examples disclosed will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the various examples. The scope of the present subject matter is not limited to the disclosed embodiments. The disclosed embodiments merely exemplify the various examples, and modified versions of the disclosed embodiments are also encompassed by the present subject matter. Embodiments of the present subject matter are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on."

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

Methods, systems, and computer program products are provided for dynamically reconfigurable tuning for wireless power and data communications. A wireless charging (WLC) device may improve the efficiency of variable power and data communication to a chargeable device with variable relative positioning and coupling in 3D space by dynamically reconfiguring transmitter tuning. A WLC transmitter may be dynamically reconfigured (e.g., between symmetric and asymmetric antenna impedance matching) based on at least one of the type of wireless transmission or a wireless transmission efficiency for the type of wireless transmission. For example, the controller may dynamically select a configuration for wireless power (e.g., or data) transmission based on the most efficient configuration determined from dynamically measured efficiencies for asymmetric and symmetric wireless power (e.g., or data) transmission. Tuning may by dynamically reconfigured, for example, by controlling an automatically variable inductor (e.g., comprising at least one ring switch) to automatically vary inductance. Such embodiments may be implemented in various configurations, for example, as shown and discussed relative to FIGS. 1-8.

FIGS. 1A and 1B show examples of relative positioning of a wireless charging device and a chargeable device, according to an example embodiment. FIG. 1A shows an example environment 100A for implementation of dynamically reconfigurable tuning for wireless power and data communications. FIG. 1A shows WLC device 116 and chargeable device 108. FIG. 1A shows an example of a WLC device 116 as a tablet computer and a chargeable device 108 as an accessory pen that a user may use to point, select, write, draw, etc. on the tablet. FIG. 1A presents one of many possible examples of a WLC device and (re)chargeable device. A WLC device and (re)chargeable device may be, for example, a computer and an accessory that communicate using NFC. For example, besides NFC charging, which may transmit 1 W to 2 W, a WLC device and chargeable device may engage in Qi charging, which may transmit, for example, 5 W to 10 W.

As shown in FIG. 1A, WLC device 116 may comprise a computer 126, display/touchscreen 124 and cradle 102.

Computer 126 may perform operations for cradle 102 (e.g., for a WLC controller associated with WLC operations via cradle 102). Computer 126 may control display 124. Display 124 may comprise a touchscreen responding to user touch and the proximity of chargeable device (e.g., pen) 108, as shown by the line 128 drawn on display 124 by chargeable device 108. An example computing device with example features is presented in FIG. 8. In examples, computer 126 may include one or more applications, operating systems, virtual machines (VMs), storage devices, etc., that may be executed, hosted, and/or stored therein or via one or more other computing devices via network(s) (not shown). In an example, computer 126 may access one or more server devices (not shown) to provide information, request one or more services and/or receive one or more results. Computer 126 may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Computer 126 is not limited to physical machines, but may include other types of machines or nodes, such as a virtual machine, that are executed in physical machines. Computer 126 may execute one or more processes in one or more computing environments. A process is any type of executable (e.g., binary, program, application) that is being executed by a computing device. A computing environment may be any computing environment (e.g., any combination of hardware, software, and firmware).

Cradle 102 may (e.g., be configured to) engage in wireless power and data communication with (e.g., and provide storage for) chargeable device 108. Cradle 102 may include alignment features 118, 122 and a WLC circuit with WLC antenna 120. In some examples, alignment features 118 and 122 may include magnetized material. Other examples may implement one or more types of alignment features with or without magnetic material, such as mechanical (e.g., indentations, protrusions, spring-loading), sensors with sensory feedback (e.g., light, sound), etc. Although the cradle WLC circuit may be configured to transmit and receive, examples may focus on transmissions by the WLC transmitter (Tx).

Chargeable device 108 may be configured to engage in wireless power and data communication with cradle 102. Chargeable device (CD) 108 may include alignment features 110, 114 and a CD circuit with CD antenna 112. In some examples, alignment features 110, 114 may include magnetized material. Other examples may implement one or more types of alignment features with or without magnetic material, such as mechanical (e.g., indentations, protrusions, spring-loading), sensors with sensory feedback (e.g., light, sound), etc. Although the CD circuit may be configured to transmit and receive, examples may focus on reception by the CD receiver (Rx).

Position alignment between chargeable device 108 and cradle 102 may be based on alignment features 110, 114, 118, and 122 and/or other alignment features. For example, upon insertion of chargeable device 108 into cradle 102 (e.g., depending on direction of insertion), chargeable device 108 may be pulled into a position relative to cradle 102 based on magnetic attraction between alignment feature 110 on chargeable device and alignment feature 118 or 122 in cradle 102 and/or magnetic attraction between alignment feature 114 on chargeable device and alignment feature 122 or 118 in cradle 102. Position alignment between chargeable device 108 and cradle 102 (e.g., based on alignment features 110, 114, 118, and 122) may allow some variation.

Each time chargeable device 108 is inserted into cradle 102, WLC antenna 120 and CD antenna may have varying degrees of (mis)alignment despite alignment features such as 110, 114, 118, and 122. As indicated in FIG. 1A and in greater detail in FIG. 1B, the relative positions of WLC antenna 120 and CD antenna 112 may vary directionally and/or rotationally in an XYZ volume of space after each insertion of chargeable device 108 into cradle 102. CD antenna 112 may be skewed from WLC antenna rotationally 104r and/or in one or more directions 104x, 104y, 104z. Alignment between WLC antenna 120 and CD antenna 112 may impact the quality and/or efficiency of wireless power and/or data communication between WLC antenna 120 and CD antenna 112.

Figure 2:
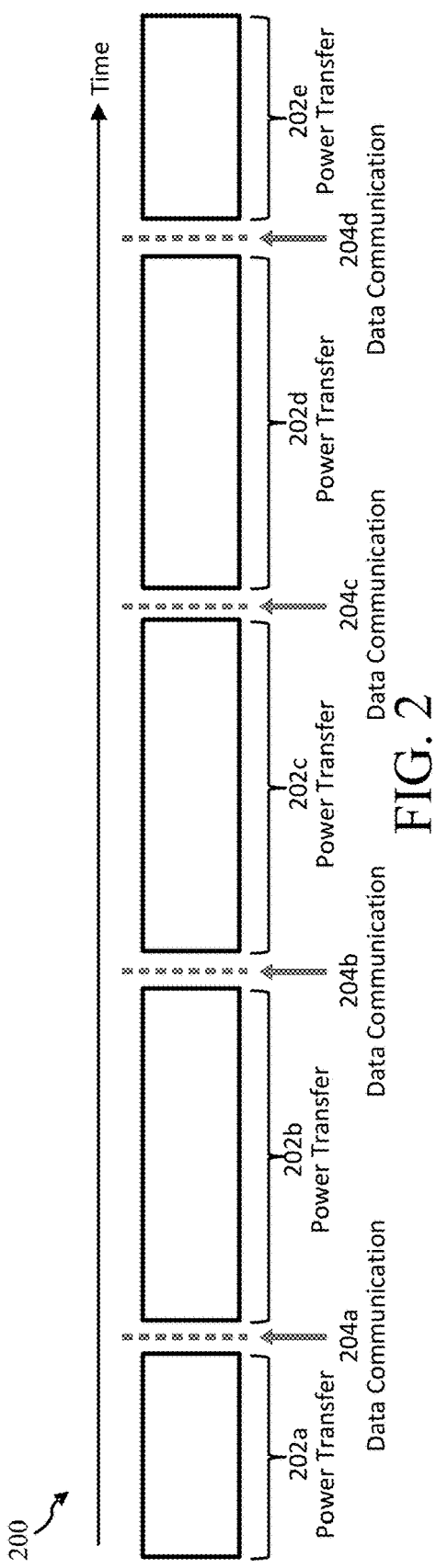
FIG. 2 shows an example of wireless power and data communications between a wireless charging device and a chargeable device, according to an example embodiment.

FIG. 2 shows an example of wireless power and data communications between a wireless charging device and a chargeable device, according to an example embodiment. FIG. 2 shows an example of a time-series wireless power transfer 202 and wireless data communication 204 between WLC device 116 and chargeable device 108. In various implementations, the periods of data communication 204a-204e may be fixed or variable. In various implementations, the periods of power transfer 202a-202e may be fixed or variable. Transmitter power levels for data communication 204 may be fixed or variable. Transmitter power levels for power transfer 202 may be fixed or variable. Transmitter power levels for data communication 204 may be the same or different compared to Transmitter power levels for power transfer 202.

As previously indicated, wireless power efficiency and data communication quality may vary based on three-dimensional (3D or xyz) mechanical volume between a Tx and an Rx. The coupling factor between Tx and Rx may vary, for example, based on changes with alignment, components, circuit parameters, etc. For example, a Tx-Rx inductive link coupling factor and Tx-Rx impedance matching may be (e.g., dominantly) altered by an engaged Tx-Rx coil antenna misalignment in a 3D volume. A wireless charging Tx input to Rx charging destination over wireless antenna link may be impedance matched to maximize power transfer. For example, near-field communication (NFC) antennas in Rx may be impedance matched to Tx driver circuitry for maximum power transfer (e.g., least possible reflection to Tx input) at an operating frequency of 13.56 MHz (e.g., an NFC forum standard). Impedance matching may be used to alleviate one or more performance issues based on misalignment. Impedance matching may be based on a reflective coefficient (e.g., referred to as the $S_{11}$ parameter). The $S_{11}$ parameter may be an input port voltage reflection coefficient indicating reflection back to WLC driver circuitry from the load (e.g., the WLC Tx antenna, which, for charging objects in Rx, may include antenna matching circuitry such as an EMC filter and a matching network in addition to the transmitter antenna). For example, if $S_{11}$ is 0 dB there is zero power transfer because the antenna circuit is perfectly unmatched to the driver circuit such that none of the incident power wave is radiated (e.g., all power is reflected). If $S_{11}$ is negative in dB there is a chance to transmit the incident power wave to receiver side. The value of an $S_{11}$ parameter may vary over frequency. The frequency where impedance is matched (e.g., where $S_{11} \ll 0$ dB) between source (e.g., WLC driver circuitry) and load (e.g., antenna circuitry) is the resonant frequency.

A Smith Chart may be used to visualize complex impedance as a function of operating frequency when designing impedance matching circuitry. A plot of impedance as a function of frequency on a Smith Chart may be a continuous line that may loop, cross and the two crossed ends of the line (e.g., tail ends) may continue in several directions (e.g., perhaps crossing again). Impedance matching may be symmetrical or asymmetrical at a given operating frequency. The type of impedance matching may be visualized based on where a plotted line crosses itself in a Smith Chart plot of (e.g., electromagnetic compatibility (EMC)) impedance as a function of operating frequency. The line crossing on the purely resistive or real impedance axis (e.g., a horizontal line) in the Smith Chart may be referred to as symmetric impedance matching or symmetric tuning at a given operating frequency while the line crossing off the real axis in inductive or capacitive regions of the Smith Chart (e.g., indicating complex impedance) at a given operating frequency may be referred to as asymmetric impedance matching or asymmetric tuning.

There may be a performance tradeoff (e.g., in power and/or data communication) between symmetrical (e.g., $S_{11}$ reflection coefficient) impedance matching and asymmetrical impedance matching. Symmetrical matching may provide better communication quality with less efficient power transfer while asymmetric matching may provide better power transfer efficiency with lower quality (e.g., noisier) data communication. Some implementations of wireless power and data communication using a common driver and antenna may use either symmetrical matching or asymmetrical matching, accepting the performance trade-off. For example, symmetrical matching for WLC NFC may have a resonant frequency ($f_{resonant}$) at 13.5 MHz and an EMC cutoff frequency ($F_{EMC}$) at approximately 16 MHz. while asymmetrical matching for WLC NFC may have a resonant frequency ($f_{resonant}$) at 13.5 MHz and an EMC cutoff frequency ($F_{EMC}$) at approximately 25 MHz, creating a noisy environment for data communication.

Dynamically reconfigurable tuning between symmetric and asymmetric impedance matching may provide higher power transfer efficiency and better quality of communications between Tx and Rx (e.g., WLC transmitter and CD receiver in the example provided in FIGS. 1 and 2), e.g., selecting the best operation of both types of tuning while eliminating the reduced power transfer efficiency by symmetric tuning and the reduced quality of data communication by asymmetric tuning. In an example, a dynamically reconfigurable inductor (e.g., EMC inductor) may be automatically controlled to switch between symmetric and asymmetric impedance matching (e.g., unlike manually adjustable inductors that would change the value of inductance and the operating frequency). For example, a variable inductor may be implemented as an inductor configured with one or more dynamically switchable ring(s) (e.g., each ring having one or more loops or windings) in proximity to the inductor (e.g., inside the inductor). When a ring is closed (e.g., a ring switch is ON), a ring may act as diamagnetic material and effectively reduce inductance of the inductor. When a ring is open (e.g., a ring switch is OFF), the inductance of the inductor may be preserved. Dynamically configurable rings may be utilized, for example, because the ring modulation does not (e.g., directly) change inductor value. Ring modulation (e.g., indirectly) modulates the field created by the inductor.

Figure 3:
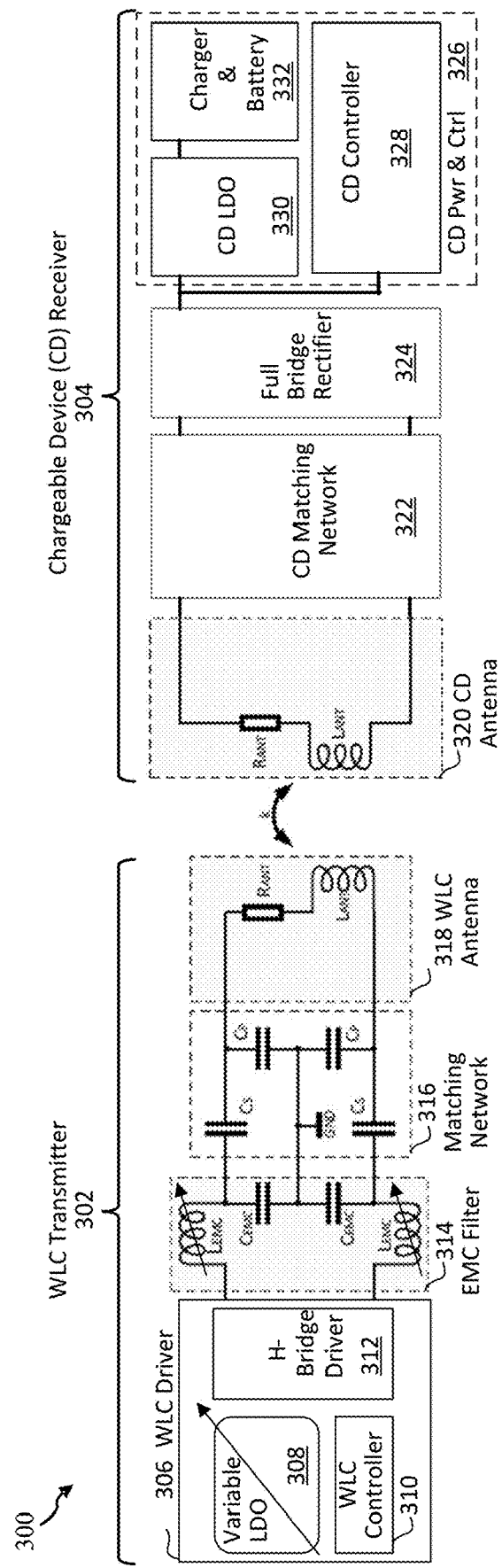
FIG. 3 shows an example of a wireless power and data communication system with dynamically reconfigurable tuning for communication with a charging device, according to an example embodiment.

Dynamically reconfigurable tuning between symmetric and asymmetric impedance matching may be implemented in other ways in other examples, such as variable EMC filter caps (e.g., $C_{EMC}$ in FIG. 3) and matching network capacitors (e.g., Cp, Cs in FIG. 3). In some examples, Cp and Cs may be in the 200 to 300 pF range. FETs or MEMs switch may be added to dynamically control capacitance. A circuit may account for capacitance of FET switches. In another example, dynamically reconfigurable tuning between symmetric and asymmetric impedance matching may be implemented by saturating the inductor(s), which may decrease inductance, although saturating by pushing more current may incur heat, component rating, power consumption and or other design concerns.

In an example, a wireless power and data communication system with dynamically reconfigurable tuning (e.g., a WLC Tx) may include a controller and a reconfigurable EMC inductor. A system may (e.g., also) include a variable power stage for power and data communication and/or a time series algorithm for power and data communication. An inductor may be modulated for a time series algorithm for power and data communication (e.g., such as the time-series communication shown in FIG. 2). In an example, power transfer efficiency for NFC may be improved by 10% to 15% depending on the XYZ volume between Tx and Rx (e.g., compared to symmetrical matching).

Dynamic tuning (e.g., dynamically controlling variable inductor(s)) may include, for example, dynamically switching tuning methods (e.g., between symmetric and asymmetric matching) by modulating EMC inductor(s) in a WLC Tx. The inductor modulation may be executed by controlling (e.g., dynamically switching) one or more diamagnetic ring switches that open and close the ring(s). WLC system tuning may reconfigure the WLC system to an asymmetric tuning system from a symmetric tuning system by engaging in EMC inductor modulation (e.g., by turning one or more ring switches ON). A WLC system may detect an Rx system (e.g., a pen or other chargeable accessory/device) at a xyz volume. The WLC Tx may try both symmetric and asymmetric tuning schemes. The WLC Tx may measure power transfer efficiency on the fly in the system (e.g., dynamically) for both symmetric and asymmetric tuning. The WLC Tx may compare efficiency determinations to determine the most efficient (e.g., best) tuning scheme. The determined tuning scheme may become the contracted tuning method for efficient power transfer between a WLC and chargeable device. In some examples, data communication may be performed with a symmetric tuning scheme (e.g., with the diamagnetic ring switch OFF, which preserves an original inductance), for example, to provide higher quality data communication between the WLC device and the chargeable device.

FIG. 3 shows an example of a wireless power and data communication system with dynamically reconfigurable tuning for communication with a charging device, according to an example embodiment. Example 300 shows a WLC transmitter 302 and a chargeable device (CD) receiver 304 configured for power and data communication. WLC 302 may represent a wireless power and data communication system. WLC 302 may include, for example, WLC driver 306, EMC filter 314, matching network 316, and WLC antenna 318. Chargeable device (CD) receiver 304 may be configured to receive power from and communicate (e.g., transmit/receive data) with WLC transmitter 302. CD receiver 304 may include, for example, CD antenna 320, CD matching network 322, full bridge rectifier 324, and CD power and control 326.

WLC driver 306 may include, for example, variable low dropout regulator (LDO) 308, WLC controller 310 and H-bridge driver 312. In some examples, WLC driver 306 may be an NXP® NFC integrated circuit (IC), such as a PN7362 or a CN730. Application data sheets for PN7362, CN730 and related antenna design guides may be publically available. Variable LDO 308 may be part of a linear voltage regulator circuit. Variable LDO 308 may receive an input voltage (not shown) and dynamically step it down to another voltage. For example, variable LDO 308 may receive a 5V input voltage and dynamically step it down between 4.7V to 3.3V. Dynamic adjustment of output voltage generated by variable LDO 308 may be based on signals from controller 310, which may be ad hoc or dynamically generated and/or (pre)configured/(pre)programmed at one or more (pre)determined intervals, such as ad hoc and/or periodic cycles of power transfer 202 and data communication 204 shown in FIG. 2. H-bridge driver 312 may generate a square wave for transmission. WLC controller 310 may control the output, dynamic adjustments by LDO 308, sending power and data communication to and receiving data communication from CD receiver 304, and dynamic variable tuning for variable inductors $L_{EMC}$ in EMC filter 314. Examples of WLC controller 310 controlling variable inductors $L_{EMC}$ are shown and discussed in FIGS. 4 and 5.

EMC filter 314 may filter out noise caused by undesirable signals in the communication path between WLC driver 306 and WLC antenna 318. EMC filter 314 may include dynamically variable inductors $L_{EMC}$ and capacitors $C_{EMC}$.

Matching network 316 may provide the primary tuning circuit to match WLC antenna 318 (e.g., the Tx antenna) to CD antenna 320 (e.g., the Rx antenna). Matching network 316 may include series capacitors $C_s$ and parallel capacitors $C_p$, whose values may be configured for the matching.

WLC antenna 318 may be used for transmitting power and data to CD receiver 304 and for receiving data from CD receiver 304. WLC antenna 318 may include a parasitic resistance $R_{ANT}$ and $L_{ANT}$. An NFC antenna may be an inductor, e.g., $L_{ANT}$.

CD antenna 320 may be used for receiving power and data from WLC transmitter 302 and for transmitting data to WLC transmitter 302. CD antenna 320 may include a parasitic resistance $R_{ANT}$ and $L_{ANT}$. An NFC antenna may be an inductor, e.g., $L_{ANT}$.

CD matching network 322 may provide the primary tuning circuit to match WLC antenna 318 (e.g., the Tx antenna) to CD antenna 320 (e.g., the Rx antenna). In some examples, CD matching network 322 may include a CD (e.g., Rx) communication device that may modulate a signal for communication (e.g., for transmission and reception).

Full bridge rectifier 324 may convert an AC signal to a DC signal.

CD power and control 326 may control wireless charging and other components in CD receiver 304. CD power and control 326 may include, for example, CD controller 328, CD LDO 330 and charger and battery 332. CD controller 328 may control wireless charging and other components in CD receiver 304. CD LDO 330 may have a configured (e.g., fixed) output voltage. Charger & battery 332 may control voltage input and output for the battery pack in CD receiver 304.

Figure 4:
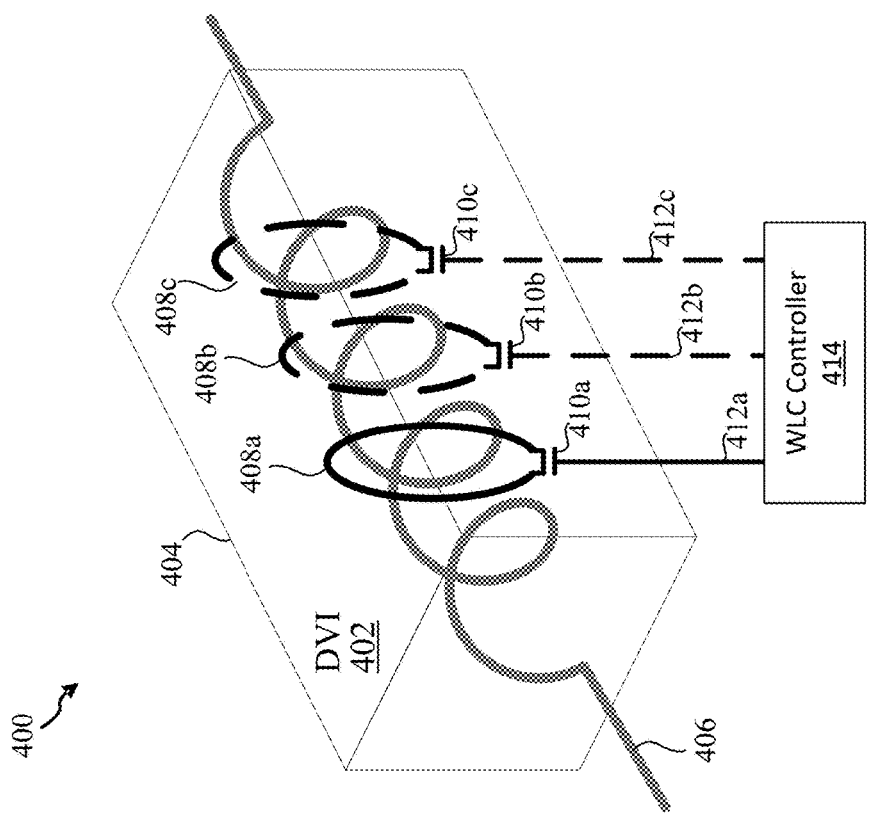
FIG. 4 shows an example of a dynamically variable inductor with at least one ring switch, according to an example embodiment.

FIG. 4 shows an example of a dynamically variable inductor with at least one ring switch in core material environment, according to an example embodiment. Example 400 shows dynamically variable inductor 402 (e.g., $L_{EMC}$ in FIG. 3) controlled by controller 414 (e.g., WLC controller 310 in FIG. 3).

Dynamically variable inductor (DVI) 402 may include, for example, an inductor package or casing 404 around an inductor 406, which may include a coil around a core material, and one or more dynamically switchable rings 408a, 408b, 408c. Various inductors may or may not have packaging. DVI 402 may have any of a variety of inductor shapes, such as toroid, solenoid, laminated, EE, UU, RM, EP, EFD, U, UI, EPC, ETD, PQ, ring, etc. The core material (not shown) may be any of a variety of materials, such as magnetic material (e.g., iron or ferrite), ceramic, air, etc.

A (e.g., each) dynamically switchable ring 408a, 408b, 408c may be passive or active. In some examples, dynamically switchable ring 408a, 408b, 408c may loop around inductor 406 while in other examples dynamically switchable ring 408a, 408b, 408c may not loop around inductor 406, but may be positioned near inductor 406. A (e.g., each) dynamically switchable ring 408a, 408b, 408c may include a ring switch 410a, 410b, 410c that opens and closes one or more rings. A (e.g., each) dynamically switchable ring 408a, 408b, 408c may include one or more loops (e.g., turns). In some examples, multiple rings may be controlled by a single switch. In some examples, one or more dynamically switchable rings may be independent of (e.g., external to) one or more inductors. Each ring switch 410a, 410b, 410c may be, for example, one or more MOSFET, MEP, or nano switches, MEMs switches, etc. A switch may be integrated with or separate from the inductor. A ring switch 410a, 410b, 410c may be controlled, for example, by WLC controller 414 via one or more control terminals (e.g., signal lines) 412a, 412b, 412c. WLC controller 414 may turn ring switch(es) 410a, 410b, 410c ON and OFF, for example, based on at least one of the type of wireless transmission (e.g., power, data) or a wireless transmission efficiency for the type of wireless transmission (e.g., the most efficient tuning for power and/or data).

Inductance modulation (e.g., closing one or more rings 410a, 410b, 410c) may cause a diamagnetic effect (e.g., relative permeability $\mu_r<1$) in the core material localized in the vicinity region of the ring area. One or more appropriately placed metallic ring(s) with one or more loops/turns may create a magnetic void (or diamagnetic effect) in the presence of a changing magnetic field. Closing one or more rings 410a, 410b, 410c may modulate the overall permeability of inductor 406 in the localized area of the ring(s), effectively altering the magnitude of inductance of inductor 406. When a switchable ring is OPEN, inductor 406 may retain an original permeability $\mu$, and the inductance of inductor 406 may remain unchanged. When a switchable ring is CLOSED, the overall permeability may be effectively reduced, which may reduce the inductance of inductor 406. The logic may be represented as follows: $\mu\_closed<\mu\_open$ therefore $L\_closed<L\_open$. Switchable ring 410a, 410b, 410c may be referred to as a permeability ($\mu$) modulating diamagnetic effect by switchable ring. The inductance may be modulated discretely based on switching a ring switch.

Figure 5:
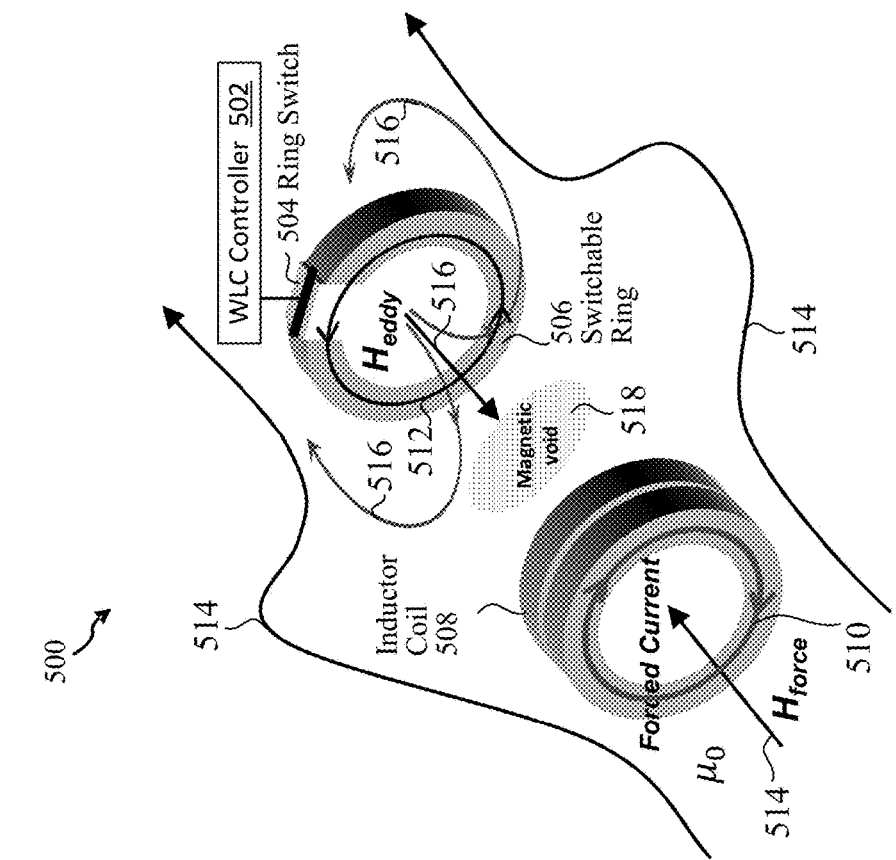
FIG. 5 shows an example of dynamically variable inductance, according to an example embodiment.

FIG. 5 shows an example of dynamically variable inductance, according to an example embodiment. FIG. 5 shows an example of the operation of a switchable ring during operation of a dynamically variable inductor 500 in air (e.g., air core inductor). FIG. 5 shows the effect of inductor coils 508 during operation and the effect of a closed ring (e.g., with ring switch 504 ON). The direction of forced current 510 through inductor coil 508 during operation is shown, creating magnetic field 514. The strength of magnetic field 514 is $H_{force}$. When WLC controller 502 turns on ring switch 504, switchable ring 506 is closed. Induced current 512 flows through switchable ring 506 in a direction opposite the direction of forced current 510, disrupting magnetic field 514 with a reverse eddy magnetic field 516 that causes magnetic void 518. The size of magnetic void 518 may be controlled, for example, by the size of ring(s), the proximity of the ring(s), the orientation of the ring(s), the number of ring(s), the number of turns in the ring(s), etc. Magnetic void 518 may be stronger, for example, if multiple rings are placed appropriately. Magnetic void 518 may be eliminated, for example, by opening the ring(s) by controlling switch(es). The direction of induced current 512 is based on the relative configuration of switchable rings 408a, 408b, 408c to inductor 406 shown in FIG. 4. Other implementations may induce current in other directions and strengths depending on, for example, the relative positions of one or more switchable rings to an inductor. The strength of reverse eddy magnetic field 516 is $H_{eddy}$. Modulated magnetic field strength $H_{total}$ may be calculated in accordance with Eq. (1):

$$H_{total}=H_{force}+H_{eddy} \qquad (1)$$

The magnetic flux $\Phi$ created by dynamically variable inductor 500 may be determined, for example, in accordance with Eq. (2) and Eq. (3):

$$\Phi = B \cdot N \cdot A = \mu \cdot \left(\frac{N^2-1}{l}\right) \cdot A = L \cdot l \qquad (2)$$

$$L = \mu \cdot \left(\frac{N^2 \cdot A}{l}\right) \qquad (3)$$

With reference to Eq. (2) and Eq. (3), $\Phi$ may be magnetic flux, B may be flux density, N may be the number of coil turns, A may be the area in square meters, $\mu$ may be the material permeability (e.g., $\mu=\mu_r \cdot \mu_0$ where $\mu_r=1$ in air), I may be the current, L may be the inductance, and l may be coil length or coil distance. It may be observed that a reduction in effective permeability (e.g., caused by turning a ring switch ON to close a ring) reduces the value of inductance in an air core environment (e.g., FIG. 5) or in a core material environment (e.g., FIG. 4).

A WLC controller (e.g., WLC controller 310, 414, 502) may, e.g., for data and/or power communication, attempt symmetric tuning with ring switch(es) OFF and asymmetric tuning with ring switch(es) ON. The WLC controller may take one or more performance-related measurements for symmetric and asymmetric operation. The WLC controller may determine efficiency and/or other performance-related parameters (e.g., signal quality) for one or more symmetric operation configurations and one or more asymmetric operation configurations (e.g., based on the number of switchable rings). In some examples, there may be multiple configurations available depending upon N-number of ring switches to modulate EMC cut-off frequency leading to impedance variation. The WLC controller may compare one or more performance related determinations for symmetric and/or asymmetric operation and select the tuning that provides better performance, e.g., for data and/or power communication.

For example, performance determinations may indicate that asymmetric tuning may provide better performance at some XYZ relative locations of a WLC antenna and CD antenna while symmetric tuning may provide better performance at some XYZ relative locations of the WLC antenna and CD antenna. The WLC controller may select the better tuning configuration based on specific XYZ relative locations of the WLC antenna and CD antenna for data and/or power transmission by a WLC device.

A WLC controller may provide efficient power transfer and less noisy robust data transfer using dynamic tuning (e.g., by dynamically controlling one or more switchable rings). In a (e.g., first) example, a WLC controller may provide asymmetric matching power transfer while providing symmetric matching data transfer. In a (e.g., second) example, a WLC controller may selectively apply the better of one or more symmetric matching configurations or one or more asymmetric matching configurations based on a comparison of efficiency and/or other performance parameters for the one or more symmetric matching configurations and the one or more asymmetric matching configurations.

Figure 6:
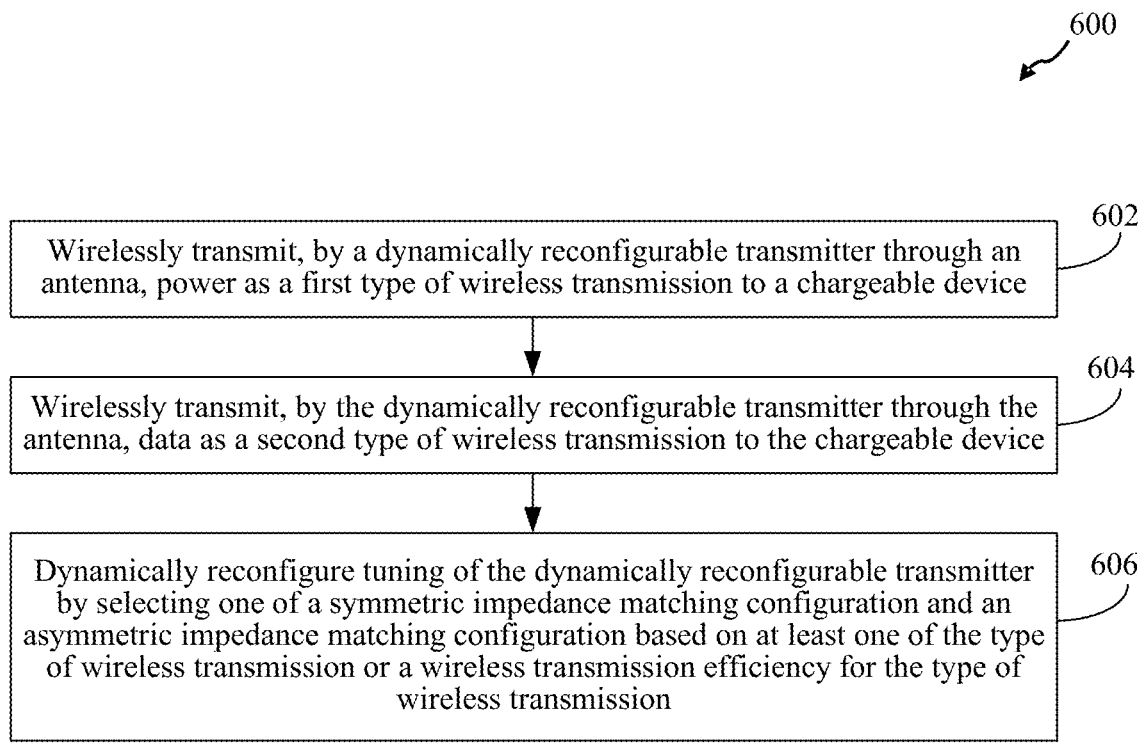
FIG. 6 shows a flowchart of a method for dynamically reconfigurable tuning for wireless power and data communications, according to an example embodiment.

FIG. 6 shows a flowchart of a method for dynamically reconfigurable tuning for wireless power and data communications, according to an example embodiment. Embodiments disclosed herein and other embodiments may operate in accordance with example method 600. Method 600 comprises steps 602-606. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 6. FIG. 6 is simply one of many possible embodiments. Embodiments may implement fewer, more or different steps.

As shown in FIG. 6, in step 602, a dynamically reconfigurable transmitter may wirelessly transmit, through an antenna to a chargeable device, power as a first type of wireless transmission. For example, as shown in FIGS. 3-5, dynamically reconfigurable WLC transmitter 302, may transmit power, for example, by performing power transfer 202, as shown in FIG. 2.

In step 604, the dynamically reconfigurable transmitter may wirelessly transmit, through the antenna to the chargeable device, data as a second type of wireless transmission. For example, as shown in FIGS. 3-5, dynamically reconfigurable WLC transmitter 302, may transmit data, for example, by performing data communication 204, as shown in FIG. 2.

In step 606, the tuning of the dynamically reconfigurable transmitter may be dynamically reconfigured by selecting one of a symmetric impedance matching configuration and an asymmetric impedance matching configuration based on at least one of the type of wireless transmission or a wireless transmission efficiency for the type of wireless transmission. For example, as shown in FIGS. 3-5, WLC controller 310, 414, 502 may dynamically reconfigure WLC transmitter 302 between symmetric and asymmetric matching configurations (e.g., by switching one or more ring switches 410a-c, 504 ON or OFF to vary dynamically variable inductor LEMC, 402, 500) based on whether the type of data communication is power transfer 202 or data communication 204 shown in FIG. 2 and/or based on a comparison of at least one wireless transmission performance parameter (e.g., transfer efficiency, data quality) for at least one symmetric impedance configuration and at least one asymmetric impedance configuration and selection of the configuration with the better performance parameters) for data or power transmission.

Figure 7:
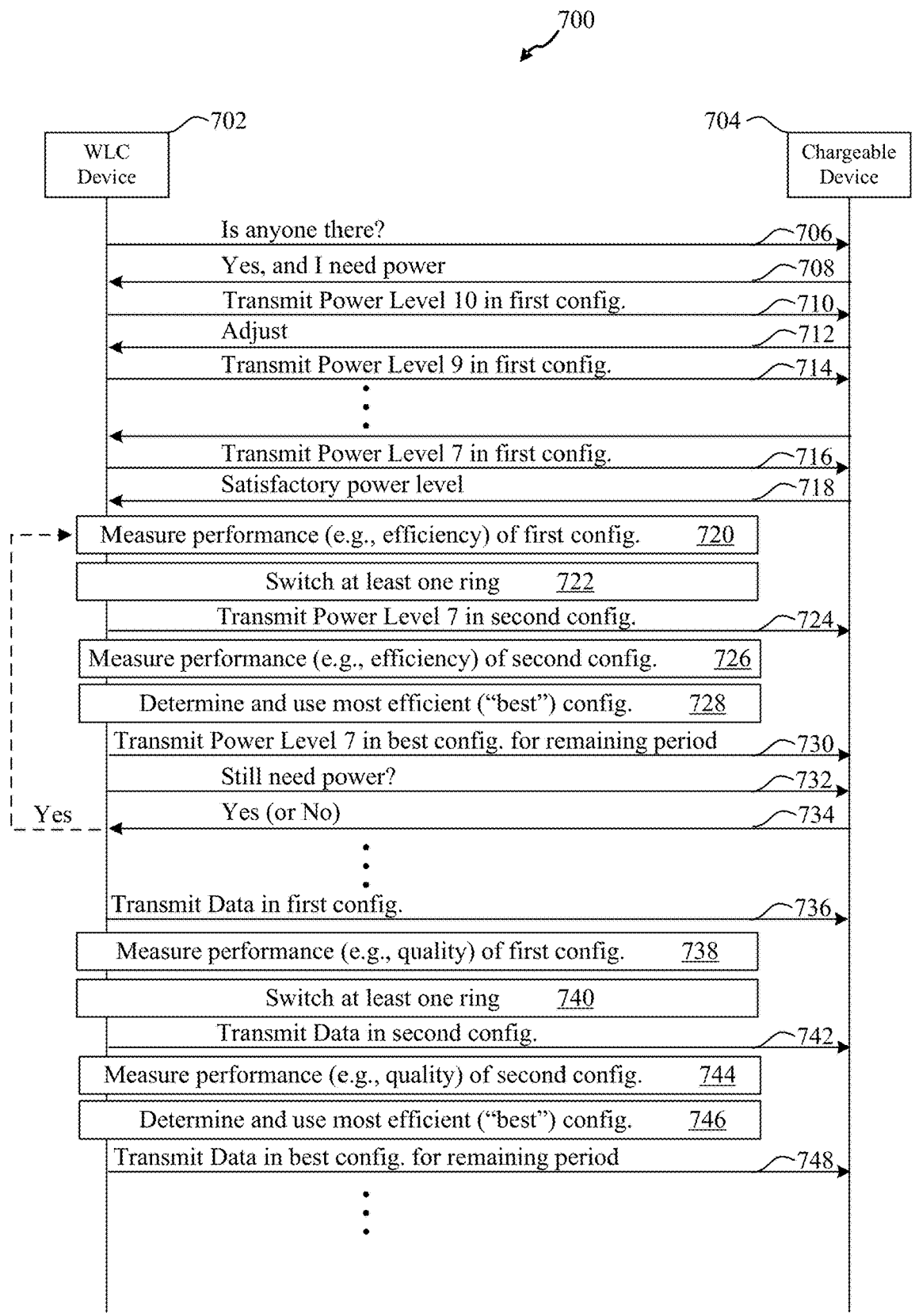
FIG. 7 shows an example of an interaction diagram with dynamically reconfigurable tuning for wireless power and data communications, according to an example embodiment.

FIG. 7 shows an example of an interaction diagram with dynamically reconfigurable tuning for wireless power and data communications, according to an example embodiment. Embodiments disclosed herein and other embodiments may operate in accordance with example method 700. Method 700 comprises steps 706-748. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 7. FIG. 7 is simply one of many possible embodiments. Embodiments may implement fewer, more or different steps.

FIG. 7 shows one of many possible examples of the example method described in FIG. 6. As shown in the example interaction diagram of FIG. 7, in step 706, WLC device 702 may inquire (e.g., in a data communication 204) whether chargeable device 704 is present. For example, as shown in FIG. 1A, WLC device 116 may inquire whether chargeable device 108 is present (e.g., sufficiently inserted into cradle 102 to engage in communication). In some examples, the detection may be automatically detected. In some examples, WLC device 116 a handshake operation may lead off power and/or data communication.

As shown in FIG. 7, in step 708, chargeable device 704 may respond (e.g., in a data communication 204) that it is present and/or may request power. For example, as shown in FIGS. 1A, chargeable device 108 may request wireless power transfer from WLC device 116.

As shown in FIG. 7, in step 710, WLC device 702 may transmit power at an initial or default level (e.g., level 10) to chargeable device 704 in a current configuration (e.g., whether a symmetric or an asymmetric impedance configuration).

As shown in FIG. 7, in step 712, chargeable device 702 may request WLC device 702 adjust the power level. In an example, if WLC device 702 started with the highest level the only adjustment may be to decrease power (e.g., incrementally). In other examples, the request to adjust may indicate a power level.

As shown in FIG. 7, in step 714, WLC device 702 may transmit power at a decremented level (e.g., level 9) to chargeable device 704 in a current configuration (e.g., whether a symmetric or an asymmetric impedance configuration). This procedure may continue until chargeable device indicates satisfaction with a power level transmitted by WLC device 702.

As shown in FIG. 7, in step 716, WLC device 702 may transmit power at a decremented level (e.g., level 7) to chargeable device 704 in a current configuration (e.g., whether a symmetric or an asymmetric impedance configuration).

As shown in FIG. 7, in step 718, chargeable device 704 may indicate to WLC device 704 that power level 7 is a satisfactory power level. In some examples, steps 710 to 718 may be repeated for each configuration.

As shown in FIG. 7, in step 720, WLC device 702 may measure the efficiency and/or other performance parameter(s) for the current configuration (e.g., whether symmetric or asymmetric impedance configuration) transferring power at power level 7. For example, as shown in FIG. 3, WLC controller 310 may determine one or more performance parameters for power transfer 202 to chargeable device 704.

As shown in FIG. 7, in step 722, WLC device 702 may switch at least one ring from ON to OFF or from OFF to ON. For example, as shown in FIGS. 3-5, WLC controller 310, 414, 502 may switch at least one ring switch 410a-c, 504 to dynamically reconfigure $L_{EMC}$.

As shown in FIG. 7, in step 724, WLC device 702 may transmit power at power level 7 to chargeable device 704 in a changed (e.g., second) configuration (e.g., whether a symmetric or an asymmetric impedance configuration).

As shown in FIG. 7, in step 726, WLC device 702 may measure the efficiency and/or other performance parameter(s) for the second configuration (e.g., whether symmetric or asymmetric impedance configuration) transferring power at power level 7. For example, as shown in FIG. 3, WLC controller 310 may determine one or more performance parameters for power transfer 202 to chargeable device 704.

As shown in FIG. 7, in step 728, WLC device 702 may determine and use the most efficient (e.g., best) configuration to continue transmitting power at power level 7. For example, as shown in FIG. 3, WLC controller 310 may compare the measured one or more performance parameters (e.g., efficiency parameters) based on transmitting power level 7 at a given XYZ relative positioning between WLC antenna 112, 318 and CD antenna 120, 320 and choose the better performing configuration, which may or may not lead to a reconfiguration (e.g., from symmetric to asymmetric or vice versa or between several asymmetric or several symmetric configurations).

As shown in FIG. 7, in step 730, WLC device 702 may transmit power at level 7 in the "best" configuration for the remaining period of power transfer (e.g., for a determined period of power transfer 202).

As shown in FIG. 7, in step 732, WLC device 702 may inquire (e.g., in a data communication 204 at the end of a power transfer period) whether chargeable device 704 still needs power.

As shown in FIG. 7, in step 734, chargeable device 704 may indicate (e.g., in a data communication 204) whether chargeable device 704 still needs power. If chargeable device 704 does need power, the interaction procedure may, in some examples, return to step 720 to (re-)determine the "best" configuration (e.g., in case one or more conditions changed). In other examples, the interaction may return to step 710. In other examples, there may be a presumption that no conditions changed and power transfer 202 at level 7 may continue for another period (e.g., 35 seconds).

As shown in FIG. 7, in step 736, WLC device 702 may transmit data to chargeable device 704 in a current configuration (e.g., whether a symmetric or an asymmetric impedance configuration).

As shown in FIG. 7, in step 738, WLC device 702 may measure the data quality and/or other performance parameter(s) for the current configuration (e.g., whether symmetric or asymmetric impedance configuration) transferring data. For example, as shown in FIG. 3, WLC controller 310 may determine one or more performance parameters for data transfer 204 to chargeable device 704. For example, chargeable device 704 may provide feedback about data quality to WLC device 702.

As shown in FIG. 7, in step 740, WLC device 702 may switch at least one ring from ON to OFF or from OFF to ON. For example, as shown in FIGS. 3-5, WLC controller 310, 414, 502 may switch at least one ring switch 410*a-c*, 504 to dynamically reconfigure $L_{EMC}$.

As shown in FIG. 7, in step 742, WLC device 702 may transmit data to chargeable device 704 in a changed (e.g., second) configuration (e.g., whether a symmetric or an asymmetric impedance configuration).

As shown in FIG. 7, in step 744, WLC device 702 may measure the data quality and/or other performance parameter(s) for the second configuration (e.g., whether symmetric or asymmetric impedance configuration) transferring data. For example, as shown in FIG. 3, WLC controller 310 may determine one or more performance parameters for data transfer 204 to chargeable device 704. For example, chargeable device 704 may provide feedback about data quality to WLC device 702.

As shown in FIG. 7, in step 746, WLC device 702 may determine and use the most efficient (e.g., best) configuration to continue transmitting data. For example, as shown in FIG. 3, WLC controller 310 may compare the measured one or more performance parameters (e.g., data quality parameters) based on transmitting data at a given XYZ relative positioning between WLC antenna 112, 318 and CD antenna 120, 320 and choose the better performing configuration, which may or may not lead to a reconfiguration (e.g., from symmetric to asymmetric or vice versa or between several asymmetric or several symmetric configurations).

As shown in FIG. 7, in step 748, WLC device 702 may transmit data in the "best" configuration for the remaining period of data transfer (e.g., for a determined period of data transfer 204).

III. Example Computing Device Embodiments

As noted herein, the embodiments described, along with any circuits, components and/or subcomponents thereof, as well as the flowcharts/flow diagrams described herein, including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 8:
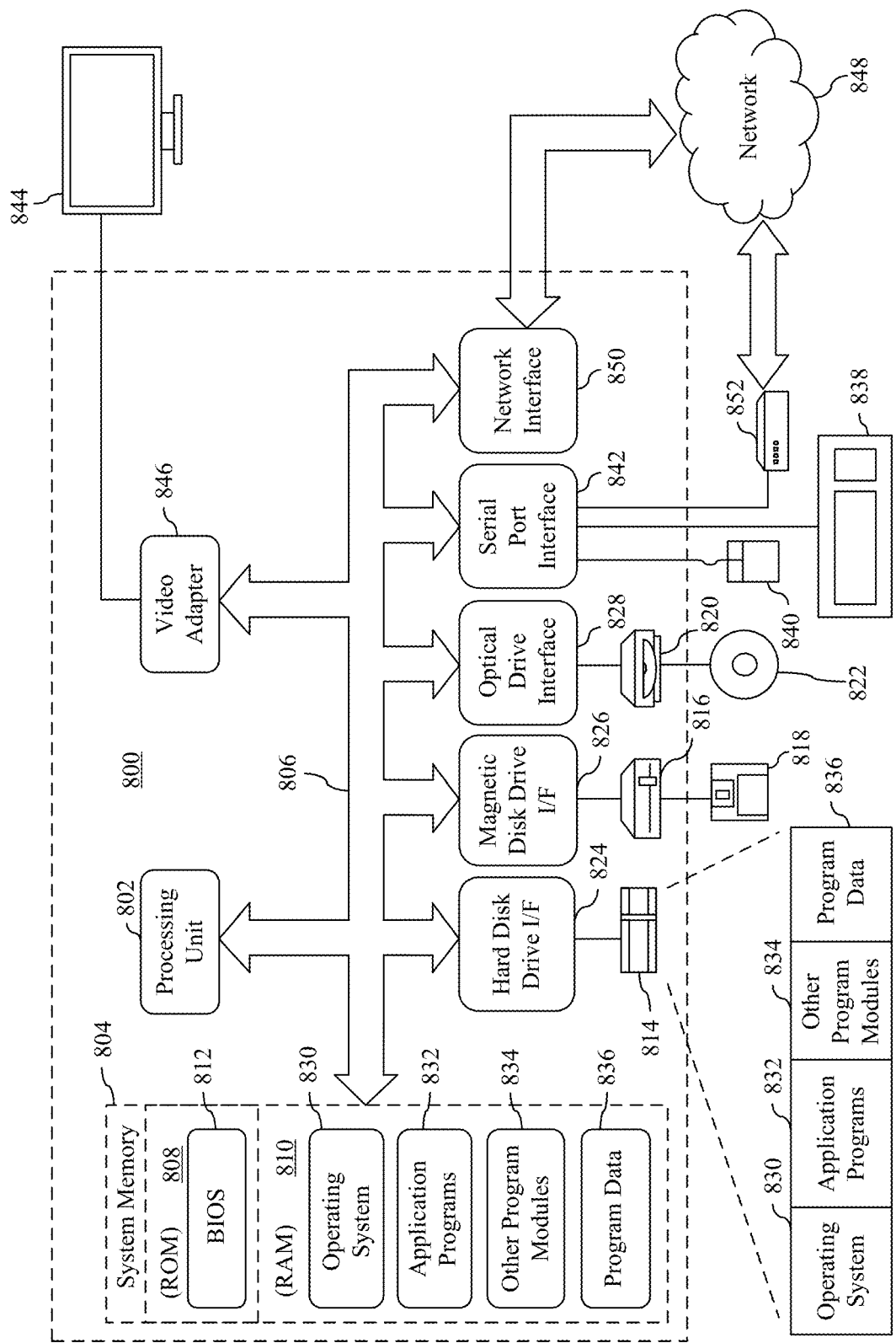
FIG. 8 shows a block diagram of an example computing device that may be used to implement example embodiments.

FIG. 8 shows an exemplary implementation of a computing device 800 in which example embodiments may be implemented. Consistent with all other descriptions provided herein, the description of computing device 800 is a non-limiting example for purposes of illustration. Example embodiments may be implemented in other types of computer systems, as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random-access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing example embodiments described herein.

A user may enter commands and information into the computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nano-technology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media that are separate and non-overlapping with embodiments directed to computer-readable storage media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 842, or any other interface type. Such computer programs, when executed or loaded by an application, enable computing device 800 to implement features of example embodiments described herein. Accordingly, such computer programs represent controllers of the computing device 800.

Example embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

Methods, systems, and computer program products are provided for dynamically reconfigurable tuning for wireless power and data communications. A wireless charging (WLC) device may improve the efficiency of variable power and data communication to a chargeable device with variable relative positioning and coupling in 3D space by dynamically reconfiguring transmitter tuning. A WLC transmitter may be dynamically reconfigured (e.g., between symmetric and asymmetric antenna impedance matching) based on at least one of the types of wireless transmission or a wireless transmission efficiency for the type of wireless transmission. For example, the controller may dynamically select a configuration for wireless power (e.g., or data) transmission based on the most efficient configuration determined from dynamically measured efficiencies for asymmetric and symmetric wireless power (e.g., or data) transmission. Tuning may by dynamically reconfigured, for example, by controlling an automatically variable inductor (e.g., comprising at least one ring switch) to automatically vary inductance.

In examples, a wireless charging (WLC) device may comprise a dynamically reconfigurable transmitter configured to wirelessly transmit power as a first type of wireless transmission to a chargeable device through an antenna, and wirelessly transmit data as a second type of wireless transmission to the chargeable device through the antenna. The WLC may comprise a controller configured to dynamically reconfigure tuning of the dynamically reconfigurable transmitter based on at least one of the type of wireless transmission or a wireless transmission efficiency for the type of wireless transmission.

In examples, a controller may be configured to dynamically reconfigure an antenna impedance matching configuration of the dynamically reconfigurable transmitter from at least one of a symmetric impedance matching configuration to an asymmetric impedance matching configuration or the asymmetric impedance matching configuration to the symmetric impedance matching configuration. Tuning may be implemented with one or multiple levels of granularity of impedance matching schemes from symmetric matching to asymmetric matching. For example, "almost symmetric matching," "slightly asymmetric matching," "more severely asymmetric matching," etc.

In examples, a controller may be (e.g., further) configured to configure the dynamically reconfigurable transmitter with the symmetric impedance matching configuration for wireless transmission of data to the chargeable device, and configure the dynamically reconfigurable transmitter with the asymmetric impedance matching configuration for wireless transmission of power to the chargeable device.

In examples, a controller may be (e.g., further) configured to configure the dynamically reconfigurable transmitter with a data transfer impedance matching configuration for wireless transmission of data to the chargeable device, and configure the dynamically reconfigurable transmitter with a power transfer impedance matching configuration for wireless transmission of power to the chargeable device.

In examples, a controller may be (e.g., further) configured to determine an asymmetric wireless power transmission efficiency for the wireless transmission of power by the dynamically reconfigurable transmitter with the asymmetric impedance matching configuration, determine a symmetric wireless power transmission efficiency for the wireless transmission of power by the dynamically reconfigurable transmitter with the symmetric impedance matching configuration, compare the asymmetric wireless power transmission efficiency to the symmetric wireless power transmission efficiency, and configure the dynamically reconfigurable transmitter to wirelessly transmit power to the chargeable device based on the comparison.

In examples, a controller may be (e.g., further) configured to determine an asymmetric wireless data transmission efficiency for the wireless transmission of data by the dynamically reconfigurable transmitter with the asymmetric impedance matching configuration, determine a symmetric wireless data transmission efficiency for the wireless transmission of data by the dynamically reconfigurable transmitter with the symmetric impedance matching configuration, compare the asymmetric wireless data transmission efficiency to the symmetric wireless data transmission efficiency, and configure the dynamically reconfigurable transmitter to wirelessly transmit data to the chargeable device based on the comparison.

In examples, the dynamically reconfigurable transmitter may comprise a filter with at least one reconfigurable inductor. The dynamic reconfiguration of the dynamically reconfigurable transmitter may comprise a dynamic reconfiguration of the at least one reconfigurable inductor.

In examples, the at least one reconfigurable inductor may comprise at least one switchable ring with at least one turn. The dynamic reconfiguration of the at least one reconfigurable inductor may comprise switching the at least one switchable ring from open to closed or from closed to open.

In examples, the first and second types of wireless transmission may be reactive (e.g., non-radiative) near-field transmissions.

In examples, a method may comprise wirelessly transmitting, by a dynamically reconfigurable transmitter through an antenna, power as a first type of wireless transmission to a chargeable device and data as a second type of wireless transmission to the chargeable device, and dynamically reconfiguring tuning of the dynamically reconfigurable transmitter by selecting one of a symmetric impedance matching configuration and an asymmetric impedance matching configuration based on at least one of the type of wireless transmission or a wireless transmission efficiency for the type of wireless transmission.

In examples, the dynamically reconfiguring tuning of the dynamically reconfigurable transmitter by selecting one of the symmetric impedance matching configuration and the asymmetric impedance matching configuration based on at least one of the type of wireless transmission or a wireless transmission efficiency for the type of wireless transmission may comprise configuring the dynamically reconfigurable transmitter with the symmetric impedance matching configuration for wireless transmission of data to the chargeable device, and configuring the dynamically reconfigurable transmitter with the asymmetric impedance matching configuration for wireless transmission of power to the chargeable device.

In examples, the dynamically reconfiguring tuning of the dynamically reconfigurable transmitter by selecting one of the symmetric impedance matching configuration and the asymmetric impedance matching configuration based on at least one of the type of wireless transmission or a wireless transmission efficiency for the type of wireless transmission may comprise configuring the dynamically reconfigurable transmitter with a data transfer impedance matching configuration for wireless transmission of data to the chargeable device, and configuring the dynamically reconfigurable transmitter with a power transfer impedance matching configuration for wireless transmission of power to the chargeable device.

In examples, the dynamically reconfiguring tuning of the dynamically reconfigurable transmitter by selecting one of the symmetric impedance matching configuration and the asymmetric impedance matching configuration based on at least one of the type of wireless transmission or a wireless transmission efficiency for the type of wireless transmission may comprise determining an asymmetric wireless power transmission efficiency for the wireless transmission of power by the dynamically reconfigurable transmitter with the asymmetric impedance matching configuration, determining a symmetric wireless power transmission efficiency for the wireless transmission of power by the dynamically reconfigurable transmitter with the symmetric impedance matching configuration, comparing the asymmetric wireless power transmission efficiency to the symmetric wireless power transmission efficiency, and configuring the dynamically reconfigurable transmitter to wirelessly transmit power to the chargeable device based on the comparison.

In examples, the dynamically reconfiguring tuning of the dynamically reconfigurable transmitter by selecting one of the symmetric impedance matching configuration and the asymmetric impedance matching configuration based on at least one of the type of wireless transmission or a wireless transmission efficiency for the type of wireless transmission may comprise determining an asymmetric wireless data transmission efficiency for the wireless transmission of data by the dynamically reconfigurable transmitter with the asymmetric impedance matching configuration, determining a symmetric wireless data transmission efficiency for the wireless transmission of data by the dynamically reconfigurable transmitter with the symmetric impedance matching configuration, comparing the asymmetric wireless data transmission efficiency to the symmetric wireless data transmission efficiency, and configuring the dynamically reconfigurable transmitter to wirelessly transmit data to the chargeable device based on the comparison.

In examples, the dynamically reconfiguring tuning of the dynamically reconfigurable transmitter by selecting one of symmetric impedance matching and asymmetric impedance matching based on at least one of the type of wireless transmission or a wireless transmission efficiency for the type of transmission may comprise modulating the tuning of the dynamically reconfigurable transmitter between the symmetric impedance matching and the asymmetric impedance matching as the dynamically reconfigurable transmitter alternates between data transmission and power transmission with the chargeable device.

In examples, the dynamically reconfiguring tuning of the dynamically reconfigurable transmitter by selecting one of the symmetric impedance matching configuration and the asymmetric impedance matching configuration based on at least one of the type of wireless transmission or a wireless transmission efficiency for the type of wireless transmission may comprise dynamically reconfiguring at least one reconfigurable inductor by toggling at least one ring switch with at least one coil associated with the at least one reconfigurable inductor.

In examples, a computer-readable storage medium may have program instructions recorded thereon that, when executed by a processing circuit, perform a method. The method may comprise, for example, determining at least one of a type of wireless transmission by a wireless charging (WLC) device or a wireless transmission efficiency for the type of wireless transmission by the WLC device, and dynamically reconfiguring tuning of a dynamically reconfigurable transmitter of the WLC device by selecting one of a symmetric impedance matching configuration of the WLC device and an asymmetric impedance matching configuration of the WLC device based on at least one of the type of wireless transmission or the wireless transmission efficiency for the type of wireless transmission.

In examples, the dynamically reconfiguring tuning of the dynamically reconfigurable transmitter by selecting one of the symmetric impedance matching configuration and the asymmetric impedance matching configuration based on at least one of the type of wireless transmission or the wireless transmission efficiency for the type of wireless transmission may comprise configuring the dynamically reconfigurable transmitter with a data transfer impedance matching configuration based on wireless transmission of data to or wireless reception of data from a chargeable device, and configuring the dynamically reconfigurable transmitter with a power transfer impedance matching configuration based on wireless transmission of power to the chargeable device.

In examples, the dynamically reconfiguring tuning of the dynamically reconfigurable transmitter by selecting one of the symmetric impedance matching configuration and the asymmetric impedance matching configuration based on at least one of the type of wireless transmission or the wireless transmission efficiency for the type of wireless transmission may comprise determining an asymmetric wireless power transmission efficiency for the wireless transmission of power by the dynamically reconfigurable transmitter with the asymmetric impedance matching configuration, determining a symmetric wireless power transmission efficiency for the wireless transmission of power by the dynamically reconfigurable transmitter with the symmetric impedance matching configuration, comparing the asymmetric wireless power transmission efficiency to the symmetric wireless power transmission efficiency, and configuring the dynamically reconfigurable transmitter to wirelessly transmit power to a chargeable device based on the comparison.

In examples, the dynamically reconfiguring tuning of the dynamically reconfigurable transmitter by selecting one of the symmetric impedance matching configuration and the asymmetric impedance matching configuration based on at least one of the type of wireless transmission or the wireless transmission efficiency for the type of wireless transmission may comprise determining an asymmetric wireless data transmission efficiency for the wireless transmission of data by the dynamically reconfigurable transmitter with the asymmetric impedance matching configuration, determining a symmetric wireless data transmission efficiency for the wireless transmission of data by the dynamically reconfigurable transmitter with the symmetric impedance matching configuration, comparing the asymmetric wireless data transmission efficiency to the symmetric wireless data transmission efficiency, and configuring the dynamically reconfigurable transmitter to wirelessly transmit data to a chargeable device based on the comparison.

V. Conclusion

While various examples have been described above, it should be understood that they have been presented by way of example only, and not limitation. It will be understood by those skilled in the relevant art(s) that various changes in form and details may be made therein without departing from the spirit and scope of the present subject matter as defined in the appended claims. Accordingly, the breadth and scope of the present subject matter should not be limited by any of the above-described examples, but should be defined only in accordance with the following claims and their equivalents.

What is claimed is:

1. A wireless charging (WLC) device comprising:
   a dynamically reconfigurable transmitter configured to:
   wirelessly transmit power as a first type of wireless transmission to a chargeable device through an antenna; and
   wirelessly transmit data as a second type of wireless transmission to the chargeable device through the antenna; and
   a controller configured to:
   dynamically reconfigure an antenna impedance matching configuration of the dynamically reconfigurable transmitter from at least one of a symmetric impedance matching configuration to an asymmetric impedance matching configuration or from the asymmetric impedance matching configuration to the symmetric impedance matching configuration based on at least one of the types of wireless transmission or a wireless transmission efficiency for the type of wireless transmission.

2. The WLC device of claim 1, wherein the controller is further configured to:
   configure the dynamically reconfigurable transmitter with the symmetric impedance matching configuration for wireless transmission of data to the chargeable device; and
   configure the dynamically reconfigurable transmitter with the asymmetric impedance matching configuration for wireless transmission of power to the chargeable device.

3. The WLC device of claim 1, further wherein the controller is further configured to:
   configure the dynamically reconfigurable transmitter with a data transfer impedance matching configuration for wireless transmission of data to the chargeable device; and
   configure the dynamically reconfigurable transmitter with a power transfer impedance matching configuration for wireless transmission of power to the chargeable device.

4. The WLC device of claim 1, wherein the controller is further configured to:
   determine an asymmetric wireless power transmission efficiency for the wireless transmission of power by the dynamically reconfigurable transmitter with the asymmetric impedance matching configuration;

determine a symmetric wireless power transmission efficiency for the wireless transmission of power by the dynamically reconfigurable transmitter with the symmetric impedance matching configuration;

compare the asymmetric wireless power transmission efficiency to the symmetric wireless power transmission efficiency; and configure the dynamically reconfigurable transmitter to wirelessly transmit power to the chargeable device based on the comparison.

5. The WLC device of claim 1, wherein the controller is further configured to:

determine an asymmetric wireless data transmission efficiency for the wireless transmission of data by the dynamically reconfigurable transmitter with the asymmetric impedance matching configuration;

determine a symmetric wireless data transmission efficiency for the wireless transmission of data by the dynamically reconfigurable transmitter with the symmetric impedance matching configuration;

compare the asymmetric wireless data transmission efficiency to the symmetric wireless data transmission efficiency; and configure the dynamically reconfigurable transmitter to wirelessly transmit data to the chargeable device based on the comparison.

6. The WLC device of claim 1, wherein the dynamically reconfigurable transmitter comprises a filter with at least one reconfigurable inductor; and wherein the dynamic reconfiguration of the dynamically reconfigurable transmitter comprises a dynamic reconfiguration of the at least one reconfigurable inductor.

7. The WLC device of claim 6, wherein the at least one reconfigurable inductor comprises at least one switchable ring with at least one turn; and wherein the dynamic reconfiguration of the at least one reconfigurable inductor comprises switching the at least one switchable ring from open to closed or from closed to open.

8. The WLC device of claim 1, wherein the first and second types of wireless transmission are reactive near-field transmissions.

9. The WLC of claim 1, wherein, to dynamically reconfigure an antenna impedance matching configuration from at least one of a symmetric impedance matching configuration to an asymmetric impedance matching configuration or from the asymmetric impedance matching configuration to the symmetric impedance matching configuration, the controller is configured to:

automatically controlling a dynamically reconfigurable inductor to switch between the symmetric impedance matching configuration and the asymmetric impedance matching configuration, the dynamically reconfigurable inductor implemented using at least one dynamically switchable ring switch having at least one loop or winding.

10. A method, comprising:

wirelessly transmitting, by a dynamically reconfigurable transmitter through an antenna, power as a first type of wireless transmission to a chargeable device;

wirelessly transmitting, by the dynamically reconfigurable transmitter through the antenna, data as a second type of wireless transmission to the chargeable device; and dynamically reconfiguring tuning of the dynamically reconfigurable transmitter by selecting one of a symmetric impedance matching configuration and an asymmetric impedance matching configuration based on at least one of the type of wireless transmission or a wireless transmission efficiency for the type of wireless transmission.

11. The method of claim 10, wherein the dynamically reconfiguring tuning of the dynamically reconfigurable transmitter by selecting one of the symmetric impedance matching configuration and the asymmetric impedance matching configuration based on at least one of the type of wireless transmission or a wireless transmission efficiency for the type of wireless transmission comprises:

configuring the dynamically reconfigurable transmitter with the symmetric impedance matching configuration for wireless transmission of data to the chargeable device; and configuring the dynamically reconfigurable transmitter with the asymmetric impedance matching configuration for wireless transmission of power to the chargeable device.

12. The method of claim 10, wherein the dynamically reconfiguring tuning of the dynamically reconfigurable transmitter by selecting one of the symmetric impedance matching configuration and the asymmetric impedance matching configuration based on at least one of the type of wireless transmission or a wireless transmission efficiency for the type of wireless transmission comprises:

configuring the dynamically reconfigurable transmitter with a data transfer impedance matching configuration for wireless transmission of data to the chargeable device; and configuring the dynamically reconfigurable transmitter with a power transfer impedance matching configuration for wireless transmission of power to the chargeable device.

13. The method of claim 10, wherein the dynamically reconfiguring tuning of the dynamically reconfigurable transmitter by selecting one of the symmetric impedance matching configuration and the asymmetric impedance matching configuration based on at least one of the type of wireless transmission or a wireless transmission efficiency for the type of wireless transmission comprises:

determining an asymmetric wireless power transmission efficiency for the wireless transmission of power by the dynamically reconfigurable transmitter with the asymmetric impedance matching configuration;

determining a symmetric wireless power transmission efficiency for the wireless transmission of power by the dynamically reconfigurable transmitter with the symmetric impedance matching configuration;

comparing the asymmetric wireless power transmission efficiency to the symmetric wireless power transmission efficiency; and configuring the dynamically reconfigurable transmitter to wirelessly transmit power to the chargeable device based on the comparison.

14. The method of claim 10, wherein the dynamically reconfiguring tuning of the dynamically reconfigurable transmitter by selecting one of the symmetric impedance matching configuration and the asymmetric impedance matching configuration based on at least one of the type of wireless transmission or a wireless transmission efficiency for the type of wireless transmission comprises:

determining an asymmetric wireless data transmission efficiency for the wireless transmission of data by the dynamically reconfigurable transmitter with the asymmetric impedance matching configuration;

determining a symmetric wireless data transmission efficiency for the wireless transmission of data by the dynamically reconfigurable transmitter with the symmetric impedance matching configuration;

comparing the asymmetric wireless data transmission efficiency to the symmetric wireless data transmission efficiency; and configuring the dynamically reconfigurable transmitter to wirelessly transmit data to the chargeable device based on the comparison.

15. The method of claim 10, wherein the dynamically reconfiguring tuning of the dynamically reconfigurable transmitter by selecting one of symmetric impedance matching and asymmetric impedance matching based on at least one of the type of wireless transmission or a wireless transmission efficiency for the type of transmission comprises:

modulating the tuning of the dynamically reconfigurable transmitter between the symmetric impedance matching and the asymmetric impedance matching as the dynamically reconfigurable transmitter alternates between data transmission and power transmission with the chargeable device.

16. The method of claim 10, wherein the dynamically reconfiguring tuning of the dynamically reconfigurable transmitter by selecting one of the symmetric impedance matching configuration and the asymmetric impedance matching configuration based on at least one of the type of wireless transmission or a wireless transmission efficiency for the type of wireless transmission comprises:

dynamically reconfiguring at least one reconfigurable inductor by toggling at least one ring switch with at least one coil associated with the at least one reconfigurable inductor.

17. A computer-readable storage medium having program instructions recorded thereon that, when executed by a processing circuit, perform a method comprising:

determining at least one of a type of wireless transmission by a wireless charging (WLC) device or a wireless transmission efficiency for the type of wireless transmission by the WLC device; and dynamically reconfiguring tuning of a dynamically reconfigurable transmitter of the WLC device by selecting one of a symmetric impedance matching configuration of the WLC device and an asymmetric impedance matching configuration of the WLC device based on at least one of the type of wireless transmission or the wireless transmission efficiency for the type of wireless transmission.

18. The computer-readable storage medium of claim 17, wherein the dynamically reconfiguring tuning of the dynamically reconfigurable transmitter by selecting one of the symmetric impedance matching configuration and the asymmetric impedance matching configuration based on at least one of the type of wireless transmission or the wireless transmission efficiency for the type of wireless transmission comprises:

configuring the dynamically reconfigurable transmitter with a data transfer impedance matching configuration based on wireless transmission of data to or wireless reception of data from a chargeable device; and configuring the dynamically reconfigurable transmitter with a power transfer impedance matching configuration based on wireless transmission of power to the chargeable device.

19. The computer-readable storage medium of claim 17, wherein the dynamically reconfiguring tuning of the dynamically reconfigurable transmitter by selecting one of the symmetric impedance matching configuration and the asymmetric impedance matching configuration based on at least one of the type of wireless transmission or the wireless transmission efficiency for the type of wireless transmission comprises:

determining an asymmetric wireless power transmission efficiency for the wireless transmission of power by the dynamically reconfigurable transmitter with the asymmetric impedance matching configuration;

determining a symmetric wireless power transmission efficiency for the wireless transmission of power by the dynamically reconfigurable transmitter with the symmetric impedance matching configuration;

comparing the asymmetric wireless power transmission efficiency to the symmetric wireless power transmission efficiency; and configuring the dynamically reconfigurable transmitter to wirelessly transmit power to a chargeable device based on the comparison.

20. The computer-readable storage medium of claim 17, wherein the dynamically reconfiguring tuning of the dynamically reconfigurable transmitter by selecting one of the symmetric impedance matching configuration and the asymmetric impedance matching configuration based on at least one of the type of wireless transmission or the wireless transmission efficiency for the type of wireless transmission comprises:

determining an asymmetric wireless data transmission efficiency for the wireless transmission of data by the dynamically reconfigurable transmitter with the asymmetric impedance matching configuration;

determining a symmetric wireless data transmission efficiency for the wireless transmission of data by the dynamically reconfigurable transmitter with the symmetric impedance matching configuration;

comparing the asymmetric wireless data transmission efficiency to the symmetric wireless data transmission efficiency; and configuring the dynamically reconfigurable transmitter to wirelessly transmit data to a chargeable device based on the comparison.

* * * * *